United States Patent
Sakalley et al.

(10) Patent No.: US 9,934,173 B1
(45) Date of Patent: Apr. 3, 2018

(54) PSEUDO CUT-THROUGH ARCHITECTURE BETWEEN NON-VOLATILE MEMORY STORAGE AND REMOTE HOSTS OVER A FABRIC

(71) Applicant: Xilinx, Inc., San Jose, CA (US)

(72) Inventors: Deboleena Sakalley, Hyderabad (IN); Santosh Singh, Hyderabad (IN); Ramesh R. Subramanian, Hyderabad (IN); Pankaj V. Kumbhare, Hyderabad (IN); Ravi K. Boddu, Hyderabad (IN)

(73) Assignee: XILINX, INC., San Jose, CA (US)

( * ) Notice: Subject to any disclaimer, the term of this patent is extended or adjusted under 35 U.S.C. 154(b) by 214 days.

(21) Appl. No.: 15/052,603

(22) Filed: Feb. 24, 2016

(51) Int. Cl.
*G06F 13/16* (2006.01)
*G06F 13/28* (2006.01)
*G06F 13/40* (2006.01)

(52) U.S. Cl.
CPC .......... *G06F 13/1673* (2013.01); *G06F 13/28* (2013.01); *G06F 13/4068* (2013.01)

(58) Field of Classification Search
CPC ....................... G06F 13/1673; G06F 15/17331
See application file for complete search history.

(56) References Cited

U.S. PATENT DOCUMENTS

| | | | | |
|---|---|---|---|---|
| 7,624,156 B1 * | 11/2009 | Hefty | ............... | H04L 49/358 370/232 |
| 2005/0080933 A1 * | 4/2005 | Herring | ............... | H04L 12/00 709/249 |
| 2006/0242330 A1 * | 10/2006 | Torudbakken | ............... | G06F 13/4004 710/5 |
| 2008/0147970 A1 * | 6/2008 | Sade | ............... | G06F 12/0873 711/113 |
| 2011/0072234 A1 * | 3/2011 | Chinya | ............... | G06F 12/1027 711/207 |

\* cited by examiner

*Primary Examiner* — Farley Abad
(74) *Attorney, Agent, or Firm* — Robert M. Brush

(57) ABSTRACT

An example method of exchanging data between a remote host and a target system includes receiving at least one remote descriptor from the remote host over a front-end fabric at a controller, the at least one remote descriptor specifying a remote buffer in a remote memory of the remote host that is larger than a page size. The method includes adding entries to a table that map the remote buffer to a plurality of page-sized virtual buffers in a virtual address space managed by the controller, generating local descriptors referencing the plurality of paged-sized virtual buffers, receiving a sequence of page-sized direct memory access (DMA) requests at the controller, generating a sequence remote DMA (RDMA) requests from the sequence of DMA requests based on the entries in the table, and sending the sequence of RDMA requests to the remote host over the front-end fabric.

20 Claims, 7 Drawing Sheets

PSEUDO CUT-THROUGH ARCHITECTURE BETWEEN NON-VOLATILE MEMORY STORAGE AND REMOTE HOSTS OVER A FABRIC

TECHNICAL FIELD

Examples of the present disclosure generally relate to electronic circuits and, in particular, to a pseudo cut-through architecture between non-volatile memory (NVM) storage and remote hosts over a fabric.

BACKGROUND

The popularity of sold state drives (SSDs) and exponential growth of network content has led to the emergence of all-non-volatile memory (NVM) storage systems, such as SSD arrays. The popularity of SSDs has also lead to the creation of a NVM Express® (NVMe) specification for SSDs connected to a Peripheral Component Interconnect (PCI) Express® bus referred to as "PCIe." The merger of NVMe and network-based storage systems, referred to herein as NVMe Over Fabric (NVMEoF), leads to the concept of making PCIe-based NVMe SSDs accessible via a network fabric using a remote direct memory access (RDMA) transport.

An NVMEoF system includes one or more remote hosts connected to an NVMEoF system via a network interface card (NIC) through a network fabric, such as an Ethernet fabric. On the backend side, the NVMEoF system manages multiple SSDs, each of which can be shared with multiple remote hosts. The remote hosts issue read and write commands to the NVMEoF system over the network by layering the NVMe protocol over an RDMA protocol. The NVMEoF system forwards these read and write commands to the back end SSDs based on an internal mapping. The RDMA protocol allows data exchange without actively involving central processing units (CPUs) of the remote hosts, thereby reducing CPU overhead. One technique to exchange data between a remote host and the NVMEoF system is a store and forward mechanism between the NVMEoF system and the backend SSDs that provide the storage.

In a store and forward mechanism, all of the data for a particular operation (e.g., read operation) is transferred to memory of the NVMEoF system before being forwarded to the remote host. In case of a write operation, the entire chunk of data will be transferred from the remote host memory to the NVMEoF memory before being forwarded to the back end SSDs. Such a store and forward mechanism, however, requires the NVMEoF system to include a large amount of memory resources and increases the latency of any read or write operation as seen from the remote host. It is desirable to exchange data between remote hosts and an NVMEoF system using less memory resources and with low latency.

SUMMARY

Techniques for providing a pseudo cut-through architecture for transferring data between solid state storage and remote hosts over a fabric are described. In an example, a method of exchanging data between a remote host and a target system over a front-end fabric, the target system including a nonvolatile memory (NVM) subsystem coupled to a back end fabric having a different transport than the front-end fabric, is described. The method includes receiving at least one remote descriptor from the remote host over the front-end fabric at a controller, at least one remote descriptor specifying a remote buffer in a remote memory of the remote host that is larger than a page size. The method includes adding entries to a table that map the remote buffer to a plurality of page-sized virtual buffers in a virtual address space managed by the controller. The method includes generating local descriptors referencing the plurality of paged-sized virtual buffers. The method includes receiving a sequence of page-sized direct memory access (DMA) requests at the controller in response to the NVM subsystem consuming the local descriptors. The method includes generating a sequence remote DMA (RDMA) requests from the sequence of DMA requests based on the entries in the table. The method includes sending the sequence of RDMA requests to the remote host over the front-end fabric.

In another example, an integrated circuit (IC) includes a front-end interface configured for communication with a remote host over a front-end fabric, a back-end interface configured to communication with a nonvolatile memory (NVM) subsystem over a back-end fabric that uses a different transport than the front-end fabric, and a controller coupled between the front-end interface and the back-end interface. The controller is configured to receive at least one remote descriptor from the remote host through the front-end interface, the at least one remote descriptor specifying a remote buffer in a remote memory of the remote host that is larger than a page size. The controller is further configured to add entries to a table that map the remote buffer to a plurality of page-sized virtual buffers in a virtual address space managed by bridge. The controller is further configure to generate local descriptors referencing the plurality of paged-sized virtual buffers. The controller is further configured to receive a sequence of page-sized direct memory access (DMA) requests through the back-end interface in response to the NVM subsystem consuming the local descriptors. The controller is further configured to generate a sequence remote DMA (RDMA) requests from the sequence of DMA requests based on the entries in the table. The controller is further configured to send the sequence of RDMA requests through the front-end interface to the remote host over the front-end fabric.

In another example, a computer system includes a remote host including a memory, the memory storing a remote buffer that is larger than a page-size, a front-end fabric, a target system coupled to the remote host through the front-end fabric and configured to communicate with the remote host using a remote direct memory access (RDMA) transport, a back-end fabric, and a nonvolatile memory (NVM) subsystem coupled to the back-end fabric and configured to communicate using a transport different than the RDMA transport. The computer system further includes a controller disposed in the target system configured to receive at least one remote descriptor from the remote host through the front-end fabric, the at least one remote descriptor specifying the remote buffer. The controller is further configured to add entries to a table that map the remote buffer to a plurality of page-sized virtual buffers in a virtual address space managed by controller. The controller is further configured to generate local descriptors referencing the plurality of paged-sized virtual buffers. The controller is further configured to receive a sequence of page-sized direct memory access (DMA) requests through the back-end fabric in response to the NVM subsystem consuming the local descriptors. The controller is further configured to generate a sequence remote RDMA requests from the sequence of DMA requests based on the entries in the table. The controller is further configured to send the sequence of RDMA requests through the front-end fabric to the remote host.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
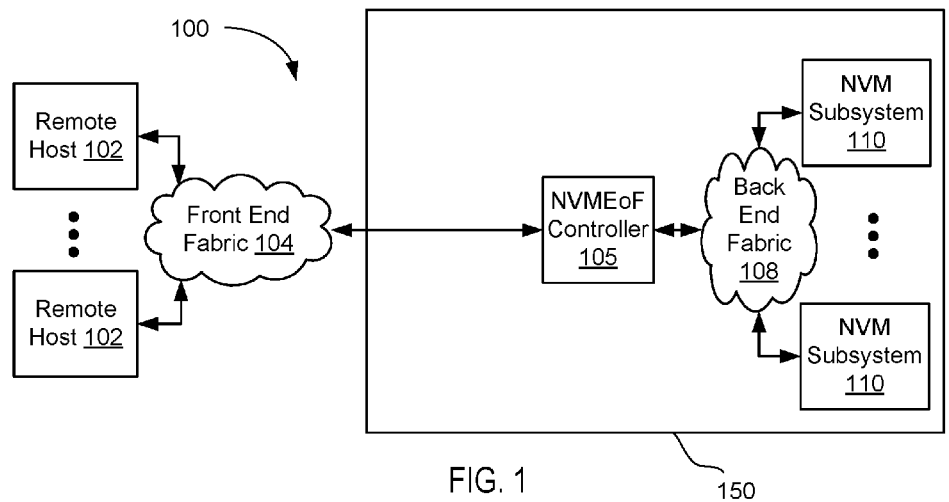
FIG. 1 is a block diagram depicting a computer system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

FIG. 1 is a block diagram depicting a computer system 100 according to an example. The computer system 100 includes one or more remote hosts 102, a front end fabric 104, an NVMEoF controller 105 (also referred to as "controller 105"), a back end fabric 108, and one or more nonvolatile memory (NVM) subsystems 110. The remote hosts 102 are coupled to the controller 105 through the front end fabric 104. The front end fabric 104 can employ an Ethernet data link layer or InfiniBand® (IB) data link layer. The remote hosts 102 can communicate with the controller 105 over the front-end fabric 104 using a remote direct memory access (RDMA) transport, such as RDMA over Converged Ethernet (RoCE), IB, Internet Wide Area RDMA (iWARP), or the like. The controller 105 is coupled to the NVM subsystems 110 through the back-end fabric 108. The back-end fabric 108 can employ a different transport than the front-end fabric 104. In an example, the back-end fabric 108 is a Peripheral Component Interconnect (PCI) Express® (PCIe) fabric. The controller 105 provides an interface between the remote hosts 102 and the NVM subsystems 110. The controller 105 is coupled to the NVM subsystems 110 through the back end fabric 108. The NVM subsystem 110 is configured to persistently store data using a NVM technology, such as solid state disk (SSD) storage technology.

In an example, the NVM subsystem 110 includes a register interface compliant with an NVM Express® (NVMe) specification, such as NVM Express rev. 1.2. The controller 105, the back-end fabric 108, and the NVM subsystems 110 are collectively referred to as a target system 150. The remote hosts 102 can issue commands targeting the target system 150 using NVMe layered over RDMA transport. The controller 105 receives the commands and provides an interface between the different transports used by the front-end and back-end fabrics 104 and 108.

Figure 2:
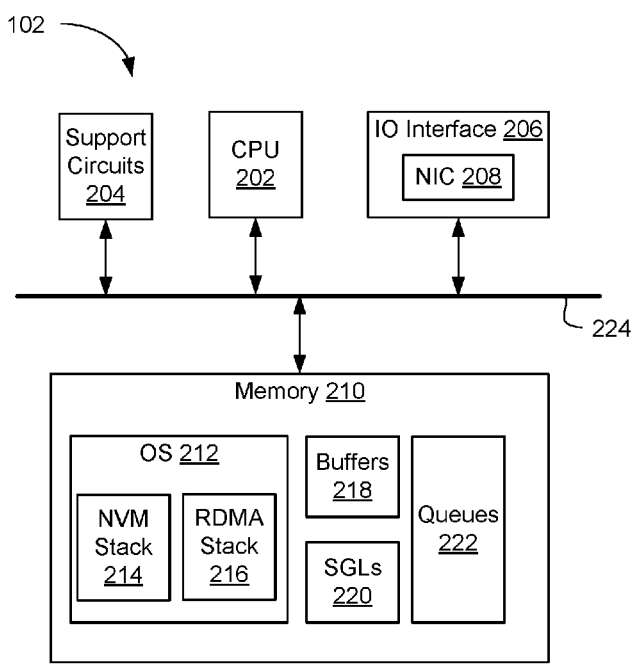
FIG. 2 is a block diagram depicting a remote host according to an example.

FIG. 2 is a block diagram depicting a remote host 102 according to an example. The remote host 102 includes a central processing unit (CPU) 202, one or more support circuits 204, an input/output (IO) interface 206, and a memory 210 coupled to a bus 224. The CPU 202 can include one or more microprocessors. The support circuits 204 can include conventional cache, power supplies, clock circuits, data registers, IO interfaces, and the like. The IO interface 206 can be coupled to various IO devices, which can include conventional keyboard, mouse, and the like. The IO interface 206 can also include a network interface card (NIC) 208 configured for communicating through the front end fabric 104. As such, the NIC 208 is configured to communicate using an RDMA transport.

The memory 210 may store all or portions of one or more programs and/or data to implement aspects of the remote host 102 described herein. The memory 210 can include one or more of random access memory (RAM), read only memory (ROM), magnetic read/write memory, FLASH memory, solid state memory, or the like as well as combinations thereof. The memory 210 can store an operating system (OS) 212, buffers 218 (sometimes referred to as remote buffers 218), scatter gather lists (SGLs) 220, and queues 222. The OS 212 can include an NVM stack 214 and an RDMA stack 216. Applications can interact with the OS 212 and use the NVM stack 214 to read data from or write data to the target system 150. In an example, the NVM stack 214 complies with an NVMe specification and supports some necessary NVMe commands to implement the controller solution. The NVM stack 214 can interact with the RDMA stack 216 to layer NVMe commands over an RDMA transport for communication to the target system 150 over the front end fabric 104. The NVM stack 214 can maintain queues 222 for NVMe commands. The NVMe commands can reference SGLs 220, which in turn reference the buffers 218. The RDMA stack 216 reads data to and from the buffers 218 using RDMA transactions.

Figure 3:
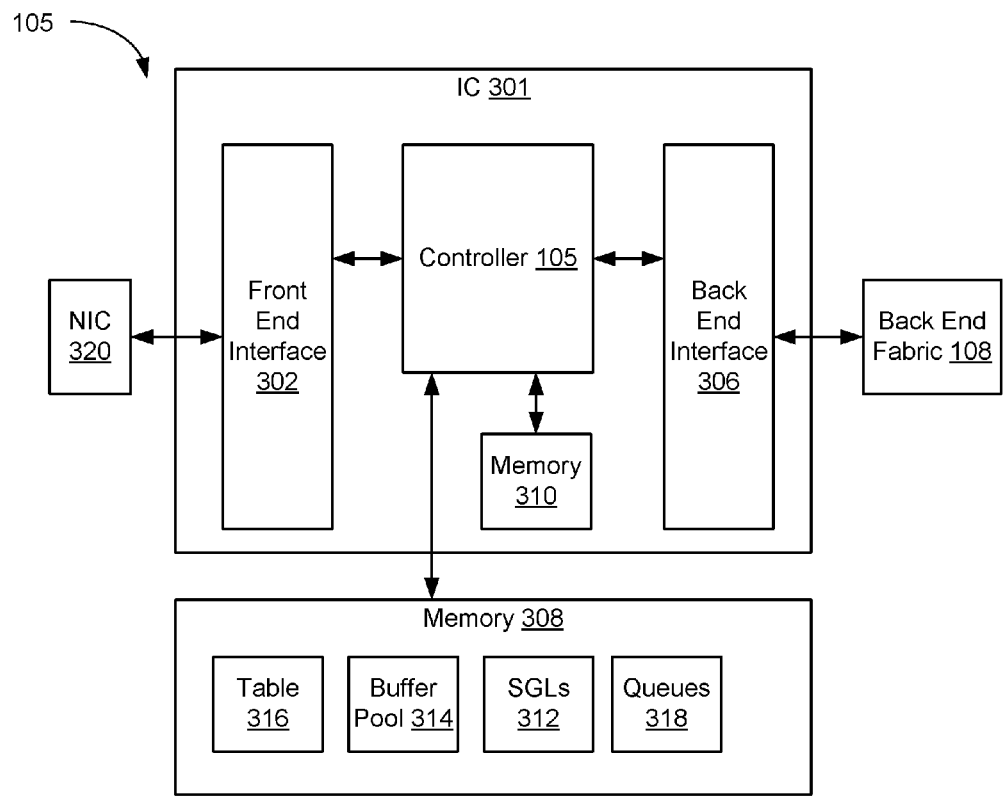
FIG. 3 is a block diagram depicting a target system according to an example.

FIG. 3 is a block diagram depicting a portion of the target system 150 according to an example. The target system 150 includes an integrated circuit (IC) 301. In an example, the IC 301 is a programmable IC, such as a field programmable gate array (FPGA). Alternatively, the IC 301 can be an application specific integrated circuit (ASIC). The IC 301 includes a front-end interface 302, the controller 105, and a back-end interface 306. The front-end interface 302 can be coupled to a NIC 320, which is turn is coupled to the front-end fabric 104. In the example shown, the NIC 320 is external to the IC 301. In other examples, the NIC 320 can be implemented within the IC 301. The back-end interface 306 is configured for communication with one or more NVM subsystems 110 through the back-end fabric 108. For example, the back-end interface 306 can be a PCIe fabric port. The controller 105 can interface with a memory 308 external to the IC 301. In some examples, the controller 105 can also interface with a memory 310 implemented within the IC 301 in addition to the memory 308.

The controller 105 provides a pseudo-cut through architecture for interfacing between the front-end fabric 104 and the back-end fabric 108. The pseudo-cut through architecture provides a data transfer mechanism that partially buffers data at a logical block-size level of the NVM subsystem 110 and forwards the data on a block-by-block basis. As such, the controller 105 does not perform a store-and-forward of all requested data. The pseudo-cut through architecture of the controller 105 requires less memory resources and provides better throughput and latency than a store-and-forward mechanism.

In operation, the controller 105 can use a table 316 and a buffer pool 314 stored in the memory 308. The controller 105 can generate SGLs 312 and maintain queues 318 in the memory 308 for the NVM subsystems 110. The controller 105 can maintain entries in the table 316 that map remote buffers in the remote hosts with virtual buffers backed by the buffer pool 314. The SGLs 312 reference the virtual buffers within a virtual address space managed by the controller 105. The queues 318 store commands to be executed by the NVM subsystems 110. The commands reference the SGLs 312 for DMA transactions between the NVM subsystems 110 and the controller 105. Operation of the controller 105 is described further below.

Figure 4:
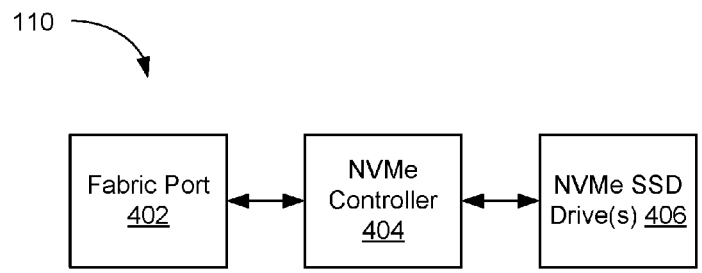
FIG. 4 is a block diagram depicting a nonvolatile memory (NVM) subsystem according to an example.

FIG. 4 is a block diagram depicting an NVM subsystem 110 according to an example. The NVM subsystem 110 includes a fabric port 402, an NVMe controller 404, and one or more NVMe SSD devices 406. The fabric port 402 provides an interface between the NVMe controller 404 and the back-end fabric 108. For example, the fabric port 402 can be a PCIe port. The NVMe controller 404 implements an NVMe register interface for the NVMe SSD devices 406. The NVMe SSD controller 404 processes the various NVMe commands, such as read commands, write commands, and the like. The NVMe SSD controller 404 consumes the SGLs 312 when executing the commands to perform DMA transactions with the controller 105.

Figure 5:
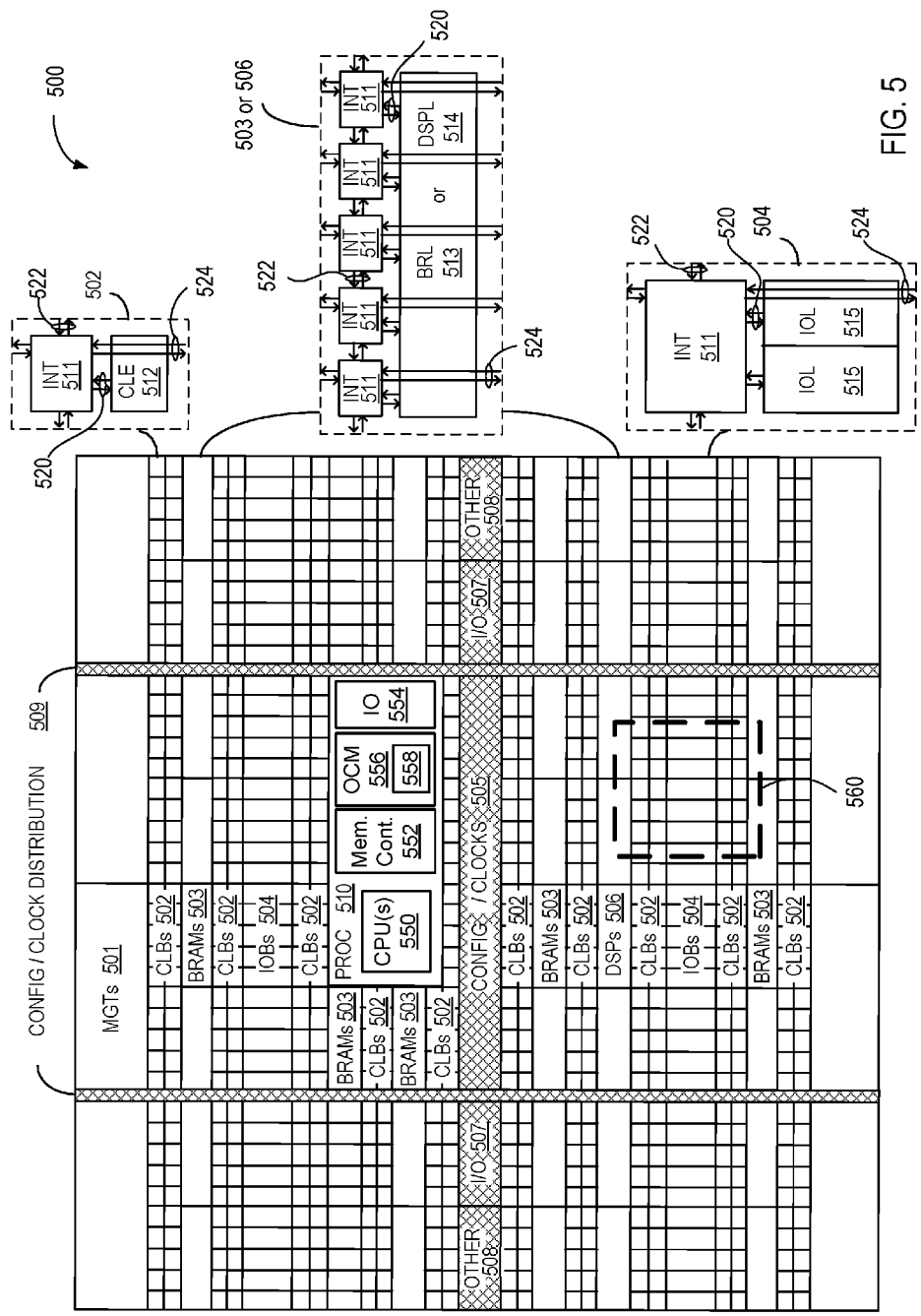
FIG. 5 illustrates an example architecture of a field programmable gate array (FPGA).

FIG. 5 illustrates an example architecture of an FPGA 500 that includes a large number of different programmable tiles including multi-gigabit transceivers ("MGTs") 501, configurable logic blocks ("CLBs") 502, random access memory blocks ("BRAMs") 503, input/output blocks ("IOBs") 504, configuration and clocking logic ("CONFIG/CLOCKS") 505, digital signal processing blocks ("DSPs") 506, specialized input/output blocks ("I/O") 507 (e.g., configuration ports and clock ports), and other programmable logic 508, such as digital clock managers, analog-to-digital converters, system monitoring logic, and so forth. Some FPGAs also include processing system ("PROC") 510.

In some FPGAs, each programmable tile can include at least one programmable interconnect element ("INT") 511 having connections to input and output terminals 520 of a programmable logic element within the same tile, as shown by examples included at the top of FIG. 5. Each programmable interconnect element 511 (also referred to as "interconnect element 511") can also include connections to interconnect segments 522 of adjacent programmable interconnect element(s) in the same tile or other tile(s). Each programmable interconnect element 511 can also include connections to interconnect segments 524 of general routing resources between logic blocks (not shown). The general routing resources can include routing channels between logic blocks (not shown) comprising tracks of interconnect segments (e.g., interconnect segments 524) and switch blocks (not shown) for connecting interconnect segments. The interconnect segments of the general routing resources (e.g., interconnect segments 524) can span one or more logic blocks. The programmable interconnect elements 511 taken together with the general routing resources implement a programmable interconnect structure ("programmable interconnect") for the illustrated FPGA.

In an example implementation, a CLB 502 can include a configurable logic element ("CLE") 512 that can be programmed to implement user logic plus a single programmable interconnect element ("INT") 511. A BRAM 503 can include a BRAM logic element ("BRL") 513 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 506 can include a DSP logic element ("DSPL") 514 in addition to an appropriate number of programmable interconnect elements. An 10B 504 can include, for example, two instances of an input/output logic element ("IOL") 515 in addition to one instance of the programmable interconnect element 511. As will be clear to those of skill in the art, the actual I/O pads connected, for example, to the I/O logic element 515 typically are not confined to the area of the input/output logic element 515.

In the pictured example, a horizontal area near the center of the die (shown in FIG. 5) is used for configuration, clock, and other control logic. Vertical columns 509 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, processor block 510 spans several columns of CLBs and BRAMs. The processing system 510 can include various components ranging from a single microprocessor to a complete programmable processing system of microprocessor(s), memory controllers, peripherals, and the like. For example, the processing system 510 can include one or more CPUs 550, a memory controller 552, on-chip memory (OCM) 556, and IO 554, among other components.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In an example, the IC 301 comprises a programmable IC having an architecture the same as or similar to the FPGA 500. The front-end interface 302, the controller 105, the back-end interface 306, and the memory 310 can be implemented within the FPGA 500. The front-end interface 302 and the back-end interface 306 can be implemented using IO in the FPGA 500, such as IO 554, MGTs 501, IOBs 504, or a combination thereof. The controller 105 can be implemented using software 558 stored in the OCM 556 configured for execution by the CPU(s) 550. Alternatively, the controller 105 can be implemented by a controller circuit 560 configured within the programmable fabric of the FPGA 500. In yet another alternative, the controller 105 can be implemented using a combination of software 558 and circuitry 560.

Figure 6:
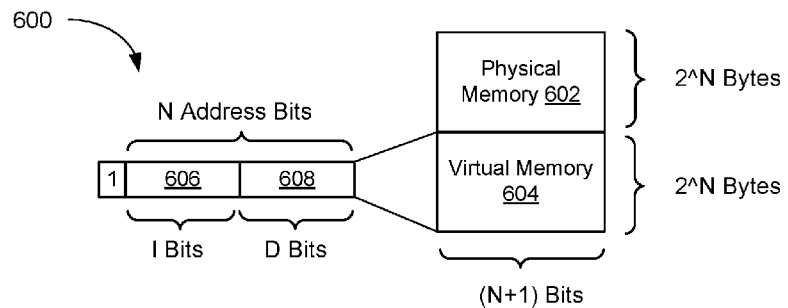
FIG. 6 is a block diagram depicting an address space of a target system according to an example.

FIG. 6 is a block diagram depicting an address space 600 of the controller 105 according to an example. The address space 600 is segmented into a physical address space specifying physical memory 602 and a virtual address space specifying virtual memory 604. The physical memory 602 includes all memory addressable by the controller 105, such as the memory 308 coupled to the IC 301 and the memory 310 disposed in the IC 301. The virtual memory 604 is managed by the controller 105 and is backed by the addressable memory of the controller 105.

An address in the address space 600 can include N+1 bits, where N is a positive integer. For example, N can be 63 bits such that the address space 600 includes 64-bit addresses. Of course, the addresses in address space 600 can greater than or less than 64. In an example, addresses targeting the physical memory 602 versus the virtual memory 604 are distinguishable based on the most significant bit (MSB) of the address. Thus, the physical memory 602 includes $2^N$ addressable bytes. Likewise, the virtual memory 604 includes $2^N$ addressable bytes. Note that the physical memory 602 can be backed by memory having less than the entire addressable range of $2^N$ bytes.

For virtual memory addresses, the MSB is set to "1" to address the virtual memory 604. Addresses with an MSB set to "0" address the physical memory 602. The N remaining bits of each virtual address are divided into MSBs 606 and least significant bits (LSBs) 608. The MSBs 606 can comprise I bits and the LSBs 608 can comprise D bits, where N=I+D. The I MSBs 606 of a virtual address comprise an index into the table 316 that contains entries mapping remote buffers to virtual buffers. The D LSBs 608 address bytes in a virtual buffer specified by the index. As such, each virtual buffer can have a size of $2^D$ bytes. For example, D can be 12 bits such that each virtual buffer is 4 kilobytes (KiB) in size. Of course, D can be greater than or less than 12 bits so that the virtual buffers can have other sizes. The size of the virtual buffer is referred to herein as a "page-size." The page-size depends on the value of D. The controller 105 can allocate $2^I$ virtual buffers, which are backed by the buffer pool 314. Note that the buffer pool 314 can be sized to accommodate less than $2^I$ virtual buffers.

Figure 7:
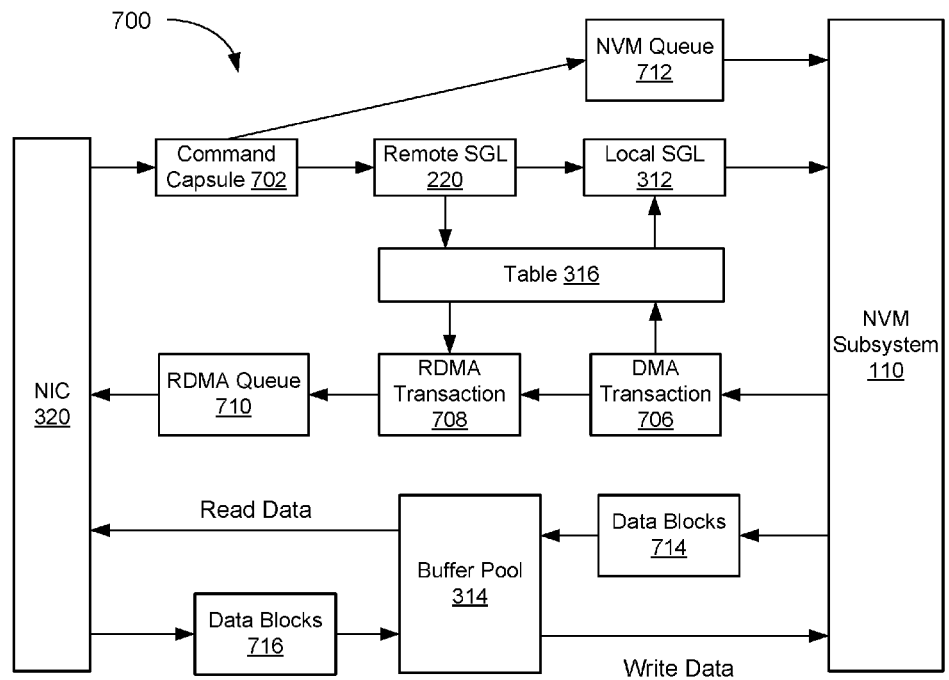
FIG. 7 is a block diagram depicting a data transfer process of a pseudo-cut through architecture employed by a bridge according to an example.

FIG. 7 is a block diagram depicting a data transfer process 700 of a pseudo-cut through architecture employed by the controller 105 according to an example. The data transfer process 700 begins when the controller 105 receives a command capsule 702 from the NIC 320 (through the front-end interface 302). The command capsule 702 includes an NVMe command and optional data. In the example, the NVMe command is either a read command for reading data from the NVM subsystem 110 or a write command for writing data to the NVM subsystem 110. The command capsule 702 is obtained through an RDMA transaction initiated by the remote host 102. For example, the command capsule 702 can be sent from the remote host 102 using an RDMA send verb.

The NVMe command includes a field specifying the first descriptor of an SGL 220 defined by the remote host 102. The first descriptor can be a data descriptor specifying a remote buffer 218 in the remote host 102. For example, a data descriptor in the SGL 220 can include an offset address, a tag, and a length of the remote buffer 218. The tag identifies a region in the memory 210 region tagged by the RDMA stack 216 for the remote buffers 218. The offset address identifies the starting address of a remote buffer 218 within the tagged memory region. The length specifies the size of at least a portion of the remote buffer 218. Notably, the SGL 220 can include one or more data descriptors. If the SGL 220 includes a single data descriptor, then the length included therein is the size of the remote buffer 218. If the SGL 220 includes multiple data descriptors, then the length in each data descriptor corresponds to a portion of the remote buffer 218. The SGL 220 can include one or more segments, where each segment includes a segment descriptor and one or more data descriptors. A segment descriptor specifies an address within the memory 210 and a length for the next segment of the SGL 220. The descriptor in the NVMe command can be either a data descriptor (in which case the SGL 220 includes only one descriptor) or a segment descriptor. If the NVMe command includes a segment descriptor, the controller 105 can obtain segment(s) of the SGL 220 from the remote host 102 using additional RDMA transaction(s). In some cases, the command capsule 702 includes additional data alongside the NVMe command. This additional data can include data descriptor(s) of the SGL 220. Thus, in some examples, the entire SGL 220 comprising one or more data descriptors can be sent in the command capsule 702.

Based on the command capsule 702, the controller 105 obtains a remote SGL 220. The remote SGL 220 comprises one or more data descriptors specifying a remote buffer 218 (referred to as "remote descriptors"). The controller 105 generates a local SGL 312 for the remote SGL 220. The local SGL 312 includes one or more data descriptors specifying a virtual buffer in the virtual memory 604 managed by the controller 105. In an example, the remote buffer 218 is larger than a page-size. Thus, the local SGL 312 includes a plurality of data descriptors (referred to as local descriptors) respectively associated with a plurality of virtual buffers. That is, the remote buffer 218 is mapped to a plurality of page-sized virtual buffers. The virtual buffers are backed by the buffer pool 314. The local SGL 312 can include a structure similar to the remote SGL 220. That is, the local SGL 312 can include one or more segments.

The controller 105 maps the remote buffer 218 to the virtual buffers using entries in the table 316. The controller 105 creates an entry for each virtual buffer mapped to the remote buffer 218. Each entry in the table 316 is indexed using the MSBs 606 of the virtual address of the corresponding virtual buffer. Further details of the entries in the table 316 are described below. In addition, the controller 105 adds the NVMe command into an NVM queue 712 for the NVM subsystem 110 (e.g., a submission queue). The field specified the first descriptor is updated to refer to the first descriptor of the local SGL 312.

The NVM subsystem 110 processes the NVMe command in the NVM queue 712 and consumes the local SGL 312. The controller 105 receives one or more DMA transactions 706 (also referred to as "DMA requests") from the NVM subsystem 110 in response to the NVM subsystem 110 consuming the local SGL 312. The controller 105 is the target of the DMA transaction(s) 706, since the data descriptor(s) in the local SGL 312 reference virtual addresses in the virtual address space managed by the controller 105. Each DMA transaction 706 is sized according to the size of the virtual buffer (e.g., page-sized DMA transactions). Depending on the NVMe command, the DMA transaction(s) 706 can be write requests or read requests. For example, if the NVMe command is a read command, the DMA transaction(s) 706 comprise one or more write requests variously referred to as "write DMA requests" or "write DMA transactions." If the NVMe command is a write command, the DMA transaction(s) 706 comprise one or more read requests variously referred to as "read DMA requests" or "read DMA transactions." In an example, the remote buffer 218 is mapped to a plurality of virtual buffers and thus the DMA transactions 706 comprise a sequence of page-sized DMA transactions from the NVM subsystem 110.

The controller 105 uses entries in the table 316 to generate RDMA transaction(s) 708 from the DMA transaction(s) 706. For a given virtual address targeted by a DMA transaction 706, the controller 105 uses the MSBs 606 to index into the table 316 and locate a corresponding entry. The controller 105 can then obtain information identifying the remote host 102 that issued the NVMe command and address information for the remote buffer 218 associated with the NVMe command. In an example, the RDMA transaction(s) 708 comprise a sequence of RDMA transactions generated from a sequence of page-sized DMA transactions. The controller 105 adds the RDMA transaction(s) 708 to an RDMA queue 710. The NIC 320 processes entries in the RDMA queue 710 to perform the RDMA transaction(s) 708. The RDMA transaction(s) 708 depend on the type of the NVMe command. For a read NVMe command, the RDMA transaction(s) 708 comprise write requests variously referred to as write RDMA transactions or write RDMA requests. Write RDMA transactions can be implemented using RDMA_write verbs. For a write NVMe command, the RDMA transaction(s) 708 comprise read requests variously referred to as read RDMA transactions or read RDMA requests. Read RDMA transactions can be implemented using RDMA_read verbs.

If the NVMe command is a read command, the NVM subsystem 110 will output data blocks 714. The data blocks 714 include one or more page-sized data blocks. For example, if the DMA transactions 706 comprise a sequence of page-sized DMA write requests, the data blocks 714 comprise a corresponding sequence of page-sized data blocks. The controller 105 buffers the data blocks 714 in the buffer pool 314. The controller 105 uses the buffer pool 314 as the source of data for the RMDA transactions 708. The NIC 320 obtains the data from the buffer pool 314 when processing the RDMA transactions 708 from the RDMA queue 710.

If the NVMe command is a write command, the NVM subsystem 110 will request data blocks. For example, the DMA transactions 706 can be a sequence of page-sized DMA read requests requesting a corresponding sequence of page-sized data blocks to be stored. The controller 105 in turn generates the RDMA transactions 708, which are issued by the NIC 320 to obtain data blocks 716. The controller 105 can store the data blocks 716 in the buffer pool 314 and forward the data blocks 716 to the NVM subsystem 110 for storage.

Notably, the data transfer process 700 does not store-and-forward an entire set of data for a given NVMe command. Rather, the controller 105 transfers a page-sized data blocks in a sequence of page-sized transactions. This conserves memory resources and provides for improved data throughput and latency than in a store-and-forward approach.

Figure 8:
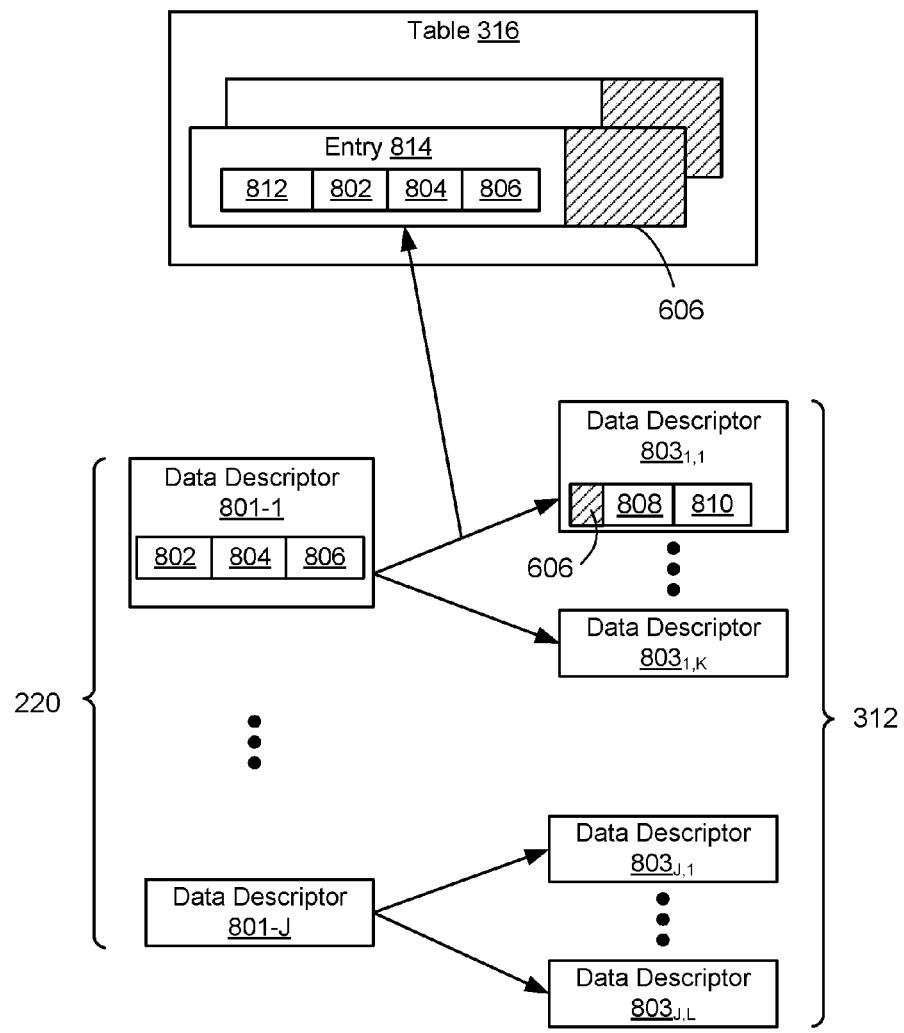
FIG. 8 is a block diagram depicting a process of mapping a remote buffer to a plurality of virtual buffers according to an example.

FIG. 8 is a block diagram depicting a process of mapping a remote buffer to a plurality of virtual buffers according to an example. A remote SGL 220 includes one or more data descriptors, e.g., data descriptors 801-1 through 801-J, where J is a positive integer. Each data descriptor 801 includes an offset 802, a tag 804, and a length 806. The controller 105 generates a set of data descriptors 803 in the local SGL 312 for each data descriptor 801 in the remote SGL 220. In the example shown, the data descriptor 801-1 is translated into the data descriptors $803_{1,1}$ through $803_{1,K}$, where K is a positive integer. The data descriptor 801-J is translated into the data descriptors $803_{J,1}$ through $803_{J,L}$, where L is a positive integer. Each data descriptor 803 includes a virtual address 808 and a length 810. The length 810 is one page-size.

Each data descriptor 801 can be translated into a different number of data descriptors 803 depending on the length 806 specified therein. For example, let the page size be 4 KiB. If the length 806 specified in a given data descriptor 801 is less than or equal to 4 KiB, then one data descriptor 801 is translated into one data descriptor 803. If the length 806 specified in a given data descriptor 801 is more than 4 KiB, then one data descriptor 801 is translated into a plurality of data descriptors 803 (e.g., a length 806 of 17 KiB would result in generation of five data descriptors 803).

The translations between the data descriptors 801 and the data descriptor(s) 803 are stored in entries 814 of the table 316. Each entry 814 includes the fields of a data descriptor 801 (e.g., the offset 802, the tag 804, and the length 806) and a host identifier 812. Each entry 814 is indexed by the MSBs 606 of the virtual address 808 of a corresponding data descriptor 803. The host identifier 812 can include identification information for the remote host 102, such as a host ID, queue ID, or the like.

Figure 9:
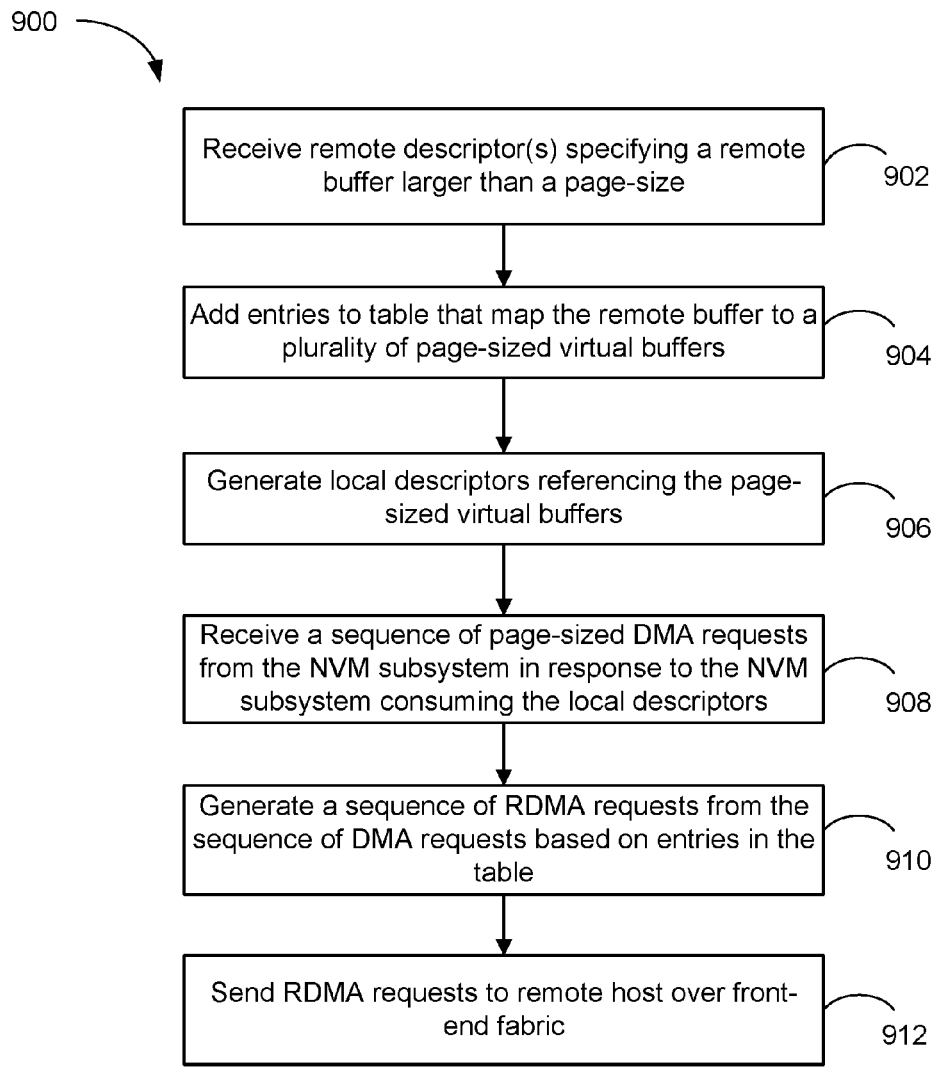
FIG. 9 is a flow diagram depicting a method of exchanging data between a remote host and a target system over a fabric.

FIG. 9 is a flow diagram depicting a method 900 of exchanging data between a remote host and a target system over a fabric. The method 900 can be performed by the controller 105. The controller 105 facilitates communication between the remote hosts 102 and the NVM subsystems 110.

The method 900 begins at block 902, wherein the controller 105 receives remote descriptor(s) 801 specifying a remote buffer larger than a defined page-size. The remote descriptors 801 are part of an SGL 220 defined by the remote host 102. In an example, the controller 105 performs block 902 by receiving a command capsule 702. Next, the controller 105 parses the command capsule 702 to obtain one or more descriptors. If the command capsule 702 includes a segment descriptor, the controller 105 requests and receives SGL segment(s) from the remote host 102. The controller 105 can then obtain the remote descriptor(s) 801 from the SGL segment(s). The controller 105 can perform block 902 by executing the above described steps in software or using circuitry, such as a state machine.

At block 904, the controller 105 adds entries 814 to the table 316 that map a remote buffer 218 to a plurality of page-sized virtual buffers. The virtual buffers are backed by the buffer pool 314 managed by the controller 105. The virtual buffers are specified using virtual addresses in a virtual address space managed by the controller 105 (e.g., the virtual memory 604). In an example, the controller 105 performs block 904 by first determining the number of virtual buffers needed for the remote descriptor(s) 801 based on the length 806 specified in each remote descriptor 801. Next, the controller 105 adds an entry 814 to the table 316 for each virtual buffer using the MSBs 606 of the virtual addresses as indices. Next, the controller 105 populates each entry 814 with host identification information 812 and address information (802, 804, and 806) for the remote buffer 218. The controller 105 can perform block 904 by executing the above-described steps software or using circuitry, such as a state machine.

At block 906, the controller 105 generates local descriptors 803 referencing the page-sized virtual buffers. The local descriptors 803 are part of a local SGL 312 to be consumed by the NVM subsystem 110. In an example, the controller 105 performs block 906 by first obtaining virtual addresses for the page-sized virtual buffers. The controller 105 can determine the virtual addresses when determining the number of required virtual buffers as determined in block 904. Next, the controller 105 adds a virtual address 808 to each local descriptor 803. Next, the controller 105 sets the length 810 in each local descriptor 803 to be the size of a page. The controller 105 can perform block 906 by executing the above-described steps in software or using circuitry, such as a state machine.

At block 908, the controller 105 receives a sequence of paged-sized DMA requests from the NVM subsystem 110 in response to the NVM subsystem 110 consuming the local descriptors 803. In an example, the controller 105 performs the block 908 by first storing an NVMe command in the NVM queue 712. Next, the controller 105 stores the SGL 312 for access by the NVM subsystem 110 (e.g., in the memory 308). Next, the controller 105 waits for DMA requests from the NVM subsystem 110. The controller 105 can perform block 908 by executing the above-described steps software or using circuitry, such as a state machine.

At block 910, the controller 105 generates a sequence of RDMA requests from the sequence of DMA requests based on entries in the table 316. In an example, the controller 105 performs the block 910 by first parsing an incoming DMA request to obtain the virtual address. Next, the controller 105 indexes into the table 316 using the MSBs 606 of the virtual address to identify the corresponding entry 814. Next, the controller 105 obtains the host identification information 812 and the address information 802, 804, and 806 for the remote buffer 218 from the entry 814. Next, the controller 105 populates an RDMA request using the host identification information 812 and the address information 802, 804, and 806. The controller 105 repeats these steps for each incoming DMA request from the NVM subsystem 110. The controller 105 can perform block 910 by executing the above-described steps using software or using circuitry, such as a state machine. At block 912, the NIC 320 sends the RMDA requests to the remote host 102 over the front-end fabric 104.

Figure 10:
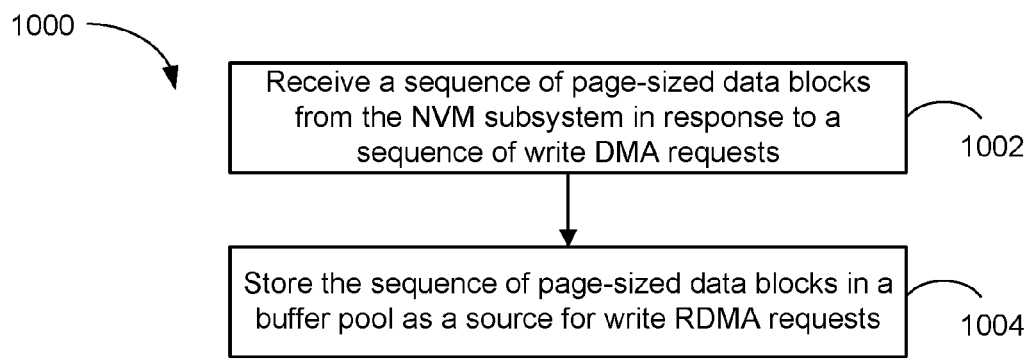
FIG. 10 is a flow diagram depicting a method of processing a read command from a remote host according to an example.

FIG. 10 is a flow diagram depicting a method 1000 of processing a read command from a remote host according to an example. The method 1000 can be performed by the controller 105. The method 1000 begins at block 1002, where the controller 105 receives a sequence of page-sized data blocks from the NVM subsystem 110 in response to a sequence of DMA write requests. The sequence of DMA write requests may be generated as described above in the method 900. In an example, the controller 105 performs the block 1002 by first receiving a write DMA request from the NVM subsystem 110 (block 908 above). Next, the controller 105 receives a page-sized data block from the NVM subsystem 110 and carries out block 910 above. The controller 105 repeats these steps for each incoming write DMA request. The controller 105 can perform block 1002 by executing the above-described steps in software or using circuitry, such as a state machine.

At block 1004, the controller 105 stores the sequence of page-sized data blocks in a buffer pool 314 as a source for write RDMA requests. For example, the controller 105 performs the block 1004 by first allocating a plurality of buffers in the buffer pool 314. Next, the controller 105 stores a received page-size data block in an allocated buffer in the buffer pool 314. Next, the controller 105 populates a write RDMA request with the address of the buffer in the buffer pool 314 having the page-sized data block. The controller 105 repeats these steps for each incoming page-sized data block. The controller 105 can perform block 1004 by executing the above-described steps in software or using circuitry, such as a state machine.

Figure 11:
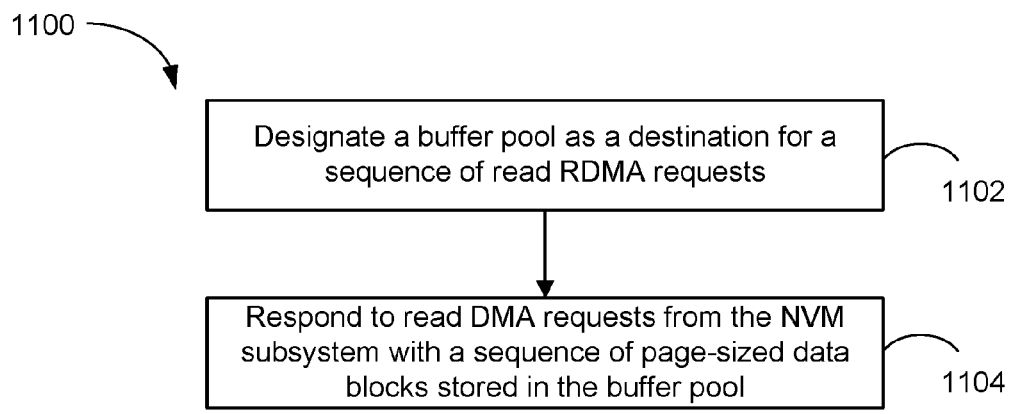
FIG. 11 is a flow diagram depicting a method of processing a write command from a remote host according to an example.

FIG. 11 is a flow diagram depicting a method 1100 of processing a write command from a remote host according to an example. The method 1100 can be performed by the controller 105. The method 1100 begins at block 1102, which happens after block 908 described above, where the controller 105 designates the buffer pool 314 as a destination for a sequence of read RDMA requests. The sequence of RDMA read requests may be generated as described above in the method 900. For example, the controller 105 can perform the block 1102 by first generating a read RDMA request in response to the NVM subsystem 110 processing the write command (block 910). Next, the controller 105 populates the RDMA request with an address of a buffer in the buffer pool 314. The controller 105 repeats these steps for each generated read RDMA request. The controller 105 can perform block 1102 by executing the above-described steps in software or using circuitry, such as a state machine.

At block 1104, the controller 105 responds to read DMA requests from the NVM subsystem 110 with a sequence of page-sized data blocks stored in the buffer pool 314. In an example, the controller 105 performs the block 1104 by first receiving a read DMA request from the NVM subsystem 110 (block 908). Next, the controller 105 allocates a buffer in the buffer pool 314 to hold a page-sized data block for the read DMA request. After performing block 1102, the controller 105 stores a page-sized data block received from the NIC 320 as a response to a read RDMA request. Next, the controller 105 responds to the read DMA request by providing the data block to the NVM subsystem 110. The controller 105 repeats these steps for each received read DMA request. The controller 105 can perform block 1104 by executing the above-described steps in software or using circuitry, such as a state machine.

While the foregoing is directed to specific examples, other and further examples may be devised without departing from the basic scope thereof, and the scope thereof is determined by the claims that follow.

What is claimed is:

1. A method of exchanging data between a remote host and a target system over a front-end fabric, the target system including a nonvolatile memory (NVM) subsystem coupled to a back end fabric having a different transport than the front-end fabric, the method comprising:
receiving at least one remote descriptor from the remote host over the front-end fabric at a controller in the target system, the at least one remote descriptor specifying a remote buffer in a remote memory of the remote host that is larger than a page size;

adding entries to a table that map the remote buffer to a plurality of page-sized virtual buffers in a virtual address space managed by the controller;

generating local descriptors referencing the plurality of paged-sized virtual buffers;

receiving a sequence of page-sized direct memory access (DMA) requests at the controller in response to the NVM subsystem consuming the local descriptors; and generating a sequence remote DMA (RDMA) requests from the sequence of DMA requests based on the entries in the table; and sending the sequence of RDMA requests to the remote host over the front-end fabric.

2. The method of claim 1, wherein the sequence of DMA requests comprises DMA requests to store data, and wherein the method further comprises:

receiving a sequence of page-sized data blocks at the controller from the NVM subsystem;

storing the sequence of page-sized data blocks in a buffer pool as a source for the sequence of RDMA requests.

3. The method of claim 1, wherein the sequence DMA requests comprises DMA requests to obtain data, and wherein the method further comprises:

designating a buffer pool as a destination for the sequence of RDMA requests; and responding to the DMA requests with a sequence page-sized data blocks stored in the buffer pool.

4. The method of claim 1, wherein each of the entries in the table relate virtual addresses defining the plurality of page-sized virtual buffers and address information for the remote buffer.

5. The method of claim 4, wherein each of the entries in the table are indexed by a plurality of most significant bits (MSBs) of the virtual addresses.

6. The method of claim 4, wherein the address information for the remote buffer includes at least one offset address and at least one tag obtained from the at least one remote descriptor.

7. The method of claim 4, wherein the entries in the table further relate the virtual addresses to an identifier for the remote host and an identifier for a queue associated with the remote host.

8. The method of claim 1, wherein the controller includes an address space segmented into the virtual address space and a local address space of a local memory, the virtual address space distinguishable from the local address space by a most significant bit (MSB) of the address space.

9. The method of claim 1, further comprising:

parsing a command capsule received from the remote host at the controller to obtain the at least one remote descriptor.

10. An integrated circuit (IC), comprising:

a front-end interface configured for communication with a remote host over a front-end fabric;

a back-end interface configured to communication with a nonvolatile memory (NVM) subsystem over a back-end fabric that uses a different transport than the front-end fabric;

a controller coupled between the front-end interface and the back-end interface, the controller configured to:

receive at least one remote descriptor from the remote host through the front-end interface, the at least one remote descriptor specifying a remote buffer in a remote memory of the remote host that is larger than a page size;

add entries to a table that map the remote buffer to a plurality of page-sized virtual buffers in a virtual address space managed by bridge;

generate local descriptors referencing the plurality of paged-sized virtual buffers;

receive a sequence of page-sized direct memory access (DMA) requests through the back-end interface in response to the NVM subsystem consuming the local descriptors; and generate a sequence remote DMA (RDMA) requests from the sequence of DMA requests based on the entries in the table; and send the sequence of RDMA requests through the front-end interface to the remote host over the front-end fabric.

11. The IC of claim 10, wherein the sequence of DMA requests comprises DMA requests to store data, and wherein the controller is further configured to:

receive a sequence of page-sized data blocks through the back-end interface from the NVM subsystem;

store the sequence of page-sized data blocks in a buffer pool as a source for the sequence of RDMA requests.

12. The IC of claim 10, wherein the sequence DMA requests comprises DMA requests to obtain data, and wherein the controller is further configured to:

designate a buffer pool as a destination for the sequence of RDMA requests; and respond to the DMA requests with a sequence page-sized data blocks stored in the buffer pool.

13. The IC of 10, wherein each of the entries in the table relate virtual addresses defining the plurality of page-sized virtual buffers and address information for the remote buffer.

14. The IC of claim 13, wherein each of the entries in the table are indexed by a plurality of most significant bits (MSBs) of the virtual addresses.

15. The IC of claim 13, wherein the address information for the remote buffer includes at least one offset address and at least one tag obtained from the at least one remote descriptor.

16. The IC of claim 13, wherein the entries in the table further relate the virtual addresses to an identifier for the remote host and an identifier for a queue associated with the remote host.

17. The IC of claim 10, wherein the controller includes an address space segmented into the virtual address space and a local address space of a local memory, the virtual address space distinguishable from the local address space by a most significant bit (MSB) of the address space.

18. The IC of claim 10, wherein the controller comprises a circuit.

19. The IC of claim 10, wherein the controller is further configured to:

parse a command capsule received through the front-end interface from the remote host to obtain the at least one remote descriptor.

20. A computer system, comprising:

a remote host including a memory, the memory storing a remote buffer that is larger than a page-size;

a front-end fabric;

a target system coupled to the remote host through the front-end fabric and configured to communicate with the remote host using a remote direct memory access (RDMA) transport;

a back-end fabric;

a nonvolatile memory (NVM) subsystem coupled to the back-end fabric and configured to communicate using a transport different than the RDMA transport;

a controller disposed in the target system configured to:
  receive at least one remote descriptor from the remote host through the front-end fabric, the at least one remote descriptor specifying the remote buffer;
  add entries to a table that map the remote buffer to a plurality of page-sized virtual buffers in a virtual address space managed by bridge;
  generate local descriptors referencing the plurality of paged-sized virtual buffers;
  receive a sequence of page-sized direct memory access (DMA) requests through the back-end fabric in response to the NVM subsystem consuming the local descriptors; and
  generate a sequence remote RDMA requests from the sequence of DMA requests based on the entries in the table; and
  send the sequence of RDMA requests through the front-end fabric to the remote host.

* * * * *